(12) United States Patent
Barbieri

(10) Patent No.: US 11,090,989 B2
(45) Date of Patent: Aug. 17, 2021

(54) COUPLING AND A VALVE ASSEMBLY FOR TUBELESS TIRES, AND RELATED FITTING METHOD

(71) Applicant: BARBIERI S.N.C. DI BARBIERI NADIA E KALMAN, Argelato - fraz. Funo (IT)

(72) Inventor: Adriano Barbieri, Argelato - fraz. Funo (IT)

(73) Assignee: Barbieri S.N.C. Di Barbieri Nadia E Kalman, Funo (IT)

( * ) Notice: Subject to any disclaimer, the term of this patent is extended or adjusted under 35 U.S.C. 154(b) by 411 days.

(21) Appl. No.: 16/091,923

(22) PCT Filed: Jun. 16, 2016

(86) PCT No.: PCT/IB2016/053583
§ 371 (c)(1),
(2) Date: Oct. 5, 2018

(87) PCT Pub. No.: WO2017/182854
PCT Pub. Date: Oct. 26, 2017

(65) Prior Publication Data
US 2019/0092108 A1    Mar. 28, 2019

(30) Foreign Application Priority Data

Apr. 22, 2016   (IT) .......................... UA2016A002810

(51) Int. Cl.
*B60C 29/02* (2006.01)
*B60C 29/00* (2006.01)
*B60C 29/06* (2006.01)

(52) U.S. Cl.
CPC ............ *B60C 29/02* (2013.01); *B60C 29/005* (2013.01); *B60C 29/066* (2013.01); *B60C 2200/12* (2013.01)

(58) Field of Classification Search
CPC ....... B60C 29/005; B60C 29/02; B60C 29/06; B60C 29/066; B60C 23/0496; B60C 25/18; F16K 15/20
See application file for complete search history.

(56) References Cited

U.S. PATENT DOCUMENTS 1,200,358 A * 10/1916 Iorns ...................... F16K 15/20
137/223
1,331,347 A * 2/1920 McNamara ........... B60C 29/066
138/89.1

(Continued)

FOREIGN PATENT DOCUMENTS

| CN | 202174901 U | 3/2012 |
| EP | 2818506 A1 | 12/2014 |
| FR | 2787064 A1 | 6/2000 |

OTHER PUBLICATIONS

International Search Report and Written Opinion dated Dec. 22, 2016 from International Patent Application No. PCT/IB2016/053583.

*Primary Examiner* — Jason R Bellinger
(74) *Attorney, Agent, or Firm* — David B. Tingey; Bryant J. Keller; Kirton McConkie

(57) ABSTRACT

A coupling for valve assemblies, for tubeless tires, includes an enclosure arranged to cover a rigid rim of a vehicle, to delimit a substantially tubular compartment, filled with gas under pressure. The coupling has a first element and a second element crossed respectively by a first through channel, threaded internally, and by a second through channel. The second element cooperates with a valve for the selective closure of the second channel. The first element rests on an internal surface of the rim, which can be activated following its hermetic insertion, from the inside of the compartment. The second element rests on an external surface of the rim, which can be activated following the (Continued)

hermetic screwing, from the outside of the compartment, of a threaded stem of the second element in the first channel, with consequent alignment between the channels to connect the compartment to the outside.

16 Claims, 4 Drawing Sheets

(56) References Cited

U.S. PATENT DOCUMENTS

| | | | | |
|---|---|---|---|---|
| 1,381,627 A * | 6/1921 | Gordon | ............... | B60C 29/06 |
| | | | | 152/428 |
| 1,401,430 A * | 12/1921 | Moyer | ............... | B60B 23/04 |
| | | | | 301/30 |
| 1,426,401 A | 8/1922 | Muller | | |
| 1,456,245 A | 5/1923 | Mang | | |
| 1,548,755 A * | 8/1925 | Sattler | ............... | B60C 25/18 |
| | | | | 152/431 |
| 1,627,480 A | 5/1927 | Christian | | |
| 1,696,211 A * | 12/1928 | Preisser | ............... | F16K 15/20 |
| | | | | 152/428 |
| 2,123,524 A * | 7/1938 | Colley | ............... | F16K 15/20 |
| | | | | 137/315.41 |
| 6,318,428 B1 * | 11/2001 | Lo | ............... | B60B 21/025 |
| | | | | 152/381.3 |
| 6,966,331 B2 * | 11/2005 | Simmons | ............... | B60C 29/02 |
| | | | | 137/223 |
| 7,086,412 B2 * | 8/2006 | Uleski | ............... | B60C 23/0408 |
| | | | | 137/223 |
| 8,122,927 B2 * | 2/2012 | Sinyard | ............... | B60C 5/04 |
| | | | | 152/429 |
| 8,646,477 B2 * | 2/2014 | Wen | ............... | B60C 29/005 |
| | | | | 137/223 |
| 8,776,850 B2 * | 7/2014 | Botte | ............... | B60C 23/0408 |
| | | | | 152/427 |
| 2004/0021368 A1 * | 2/2004 | Passarotto | ............... | B60C 29/02 |
| | | | | 301/95.104 |
| 2011/0203711 A1 * | 8/2011 | Monjuvent | ............... | B60C 29/00 |
| | | | | 152/427 |
| 2013/0186536 A1 | 7/2013 | Lee | | |
| 2015/0328944 A1 * | 11/2015 | Chen | ............... | B60C 29/02 |
| | | | | 152/428 |

\* cited by examiner

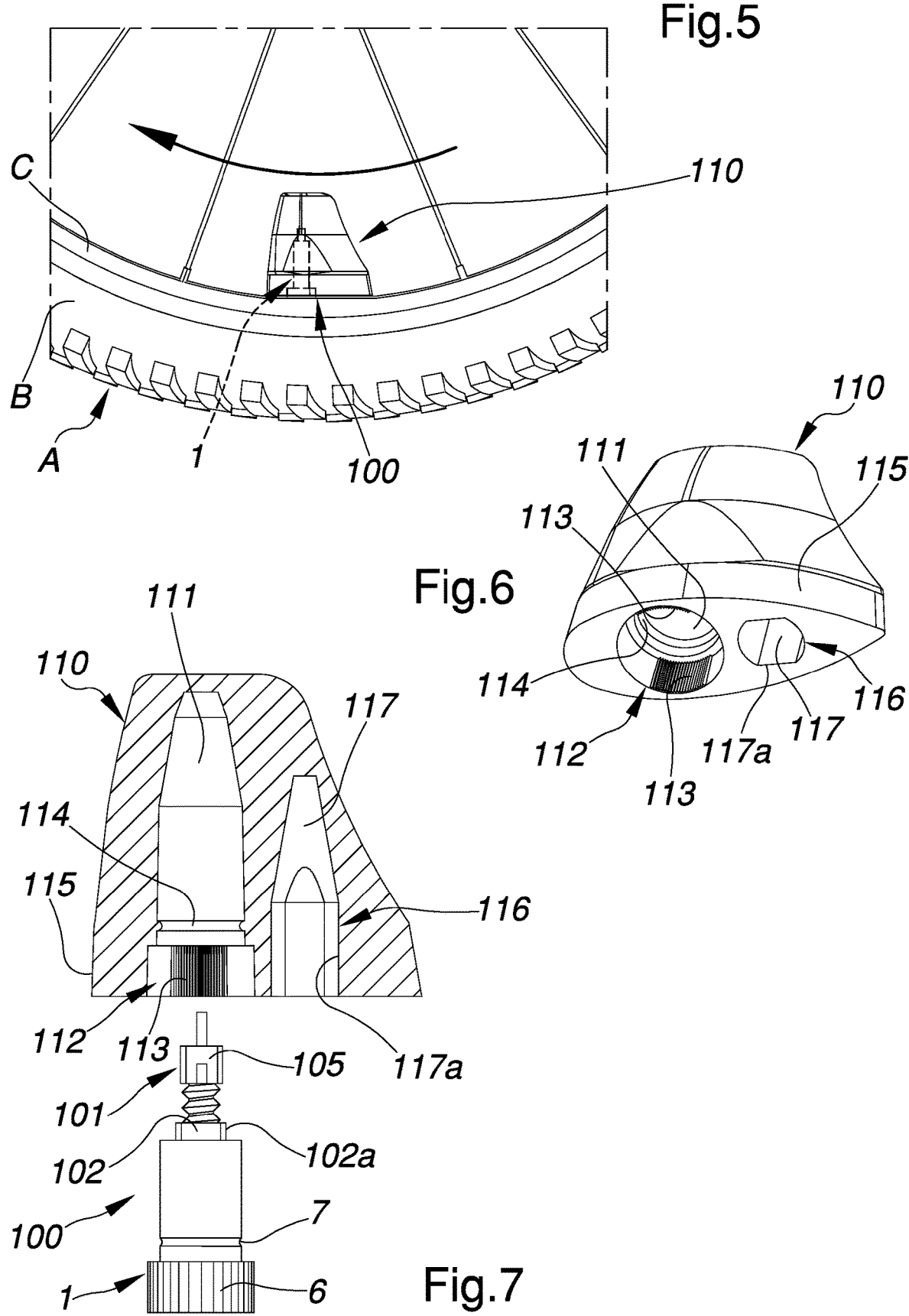

COUPLING AND A VALVE ASSEMBLY FOR TUBELESS TIRES, AND RELATED FITTING METHOD

CROSS REFERENCE TO RELATED APPLICATION(S)

This application is a U.S. National Stage Entry of International Patent Application No. PCT/IB2016/053583, filed Jun. 16, 2016, which claims the benefit of Italian Patent Application No. 102016000041591, filed Apr. 22, 2016, the disclosures of which are hereby incorporated entirely herein by reference.

TECHNICAL FIELD

The present invention relates to a coupling and a valve assembly for tubeless tires, and the relevant fitting method.

BACKGROUND ART

As known, the tires are deformable enclosures, typically made of blends, which cover the rigid rims of bicycles, motorcycles and vehicles in general; a tubular compartment is delimited between rims and tires in which air under pressure is supplied.

According to well-established procedures, each tire is associated with a respective valve assembly, through which it is possible to introduce air or let it flow out, so as to bring the pressure inside the compartment to the desired value.

In conventional tires, the valve assembly leads into an inner tube in turn contained in the compartment while, in the most recent "tubeless" type models, without inner tube, the valve assembly allows to put the external environment directly in communication with the tubular compartment.

More in detail, and precisely with specific reference to "tubeless" tires, the valve assembly comprises an axially symmetrical main body crossed by a longitudinal duct: during fitting, from the inside of the compartment the main body is hermetically inserted in a hole previously made along the surface of the rim, and then made partially protruding from the hole itself.

This way, one portion of the body is maintained protruding outwards: through this, it is possible to introduce air into the compartment, towards which the opposite end of the main body remains facing.

More precisely, the duct is normally locked by a piston supported by an internally hollow needle, in turn screwed on the head of the body, at the end of the protruding portion. When the user wishes to inflate the tire, it is sufficient to temporarily move the plunger and introduce air in the needle by means of a pump previously hooked to the needle at the head of the main body.

This embodiment is not however devoid of drawbacks.

In the fitting phase, to obtain the desired coupling and tightness, at the hole, after having inserted the body from the inside and made it partially protrude, a threaded ring has to be screwed on the protruding portion, so as to tighten the edges of the hole between the ring itself and the base of the main body, remained inside the compartment.

This operation inevitably leaves protruding outwards a portion of the body having a different length from time to time, depending on the size and the shape of the rim, and/or of the other associated components.

This proves to be very undesirable, especially under all circumstances in which the protruding portion has a significant length. As already noted, in fact, to inflate the tire, the user must mate a pump at the head of the main body, and then at the end of its protruding portion.

Therefore, when the body protrudes significantly, in the mating step and subsequently during inflation operations, the user often subjects his/her body to stress that, as a result of the elevated arm, cause bending moments and torques of significant intensity, that may result in breakage or unwanted deformation.

DESCRIPTION OF THE INVENTION

The main aim of the present invention is to solve the aforementioned problems by providing a coupling and an assembly that ensure high resistance to stress, avoiding or at least limiting the risk of breakage or deformation.

Within this aim, one object of the invention is to provide a coupling and a method which enable to fit a valve assembly on a tubeless tire, controlling the length of its external portion, protruding from the tire.

Another object of the invention is to provide a versatile coupling and valve assembly, easily adaptable to any type of tubeless tire and pump (or other inflating device).

Not the least object of the invention is to provide a coupling, a valve assembly and a method that ensure high reliability in operation, affordable costs, safe application and that they are easily obtainable starting from elements and materials commonly available on the market.

Another object of the invention is to provide a coupling and a valve assembly that adopt a technical and structural architecture alternative to those of known assemblies.

This aim and these and other objects that will become better evident hereinafter are achieved by a coupling according to claim 1.

This aim and these objects are also achieved by an assembly according to claim 8.

This aim and these objects are also achieved by a method according to claim 15.

BRIEF DESCRIPTION OF THE DRAWINGS

Further characteristics and advantages of the invention will become better evident from the description of a preferred, but not exclusive, embodiment of the coupling and valve assembly according to the invention, illustrated by way of indicative and non-limiting example, in the accompanying drawings, wherein:

FIG. 5 shows the assembly, with a protective cap, fitted on a tire, in a front elevation view;

FIG. 6 shows the protective cap, in an axonometric view;

FIG. 7 shows the protective cap sectioned according to a longitudinal plane and shows the fitting thereof on the coupling.

EMBODIMENTS OF THE INVENTION

Figure 1:
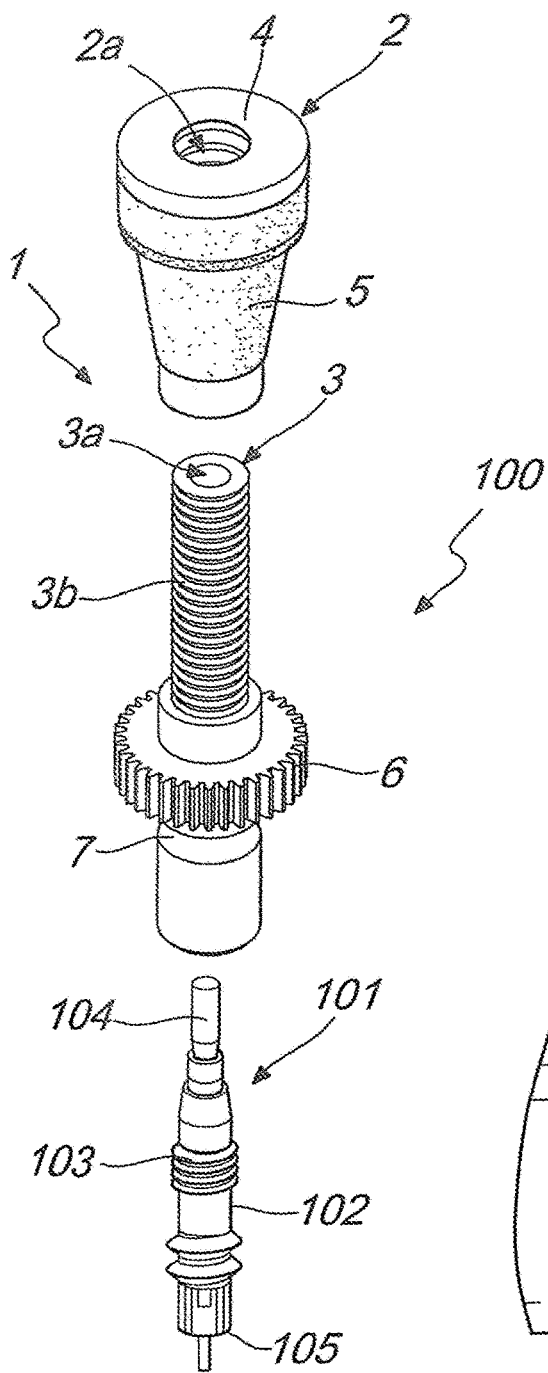
FIG. 1 shows the coupling and the assembly according to the invention, in an exploded axonometric view.
Figure 2:
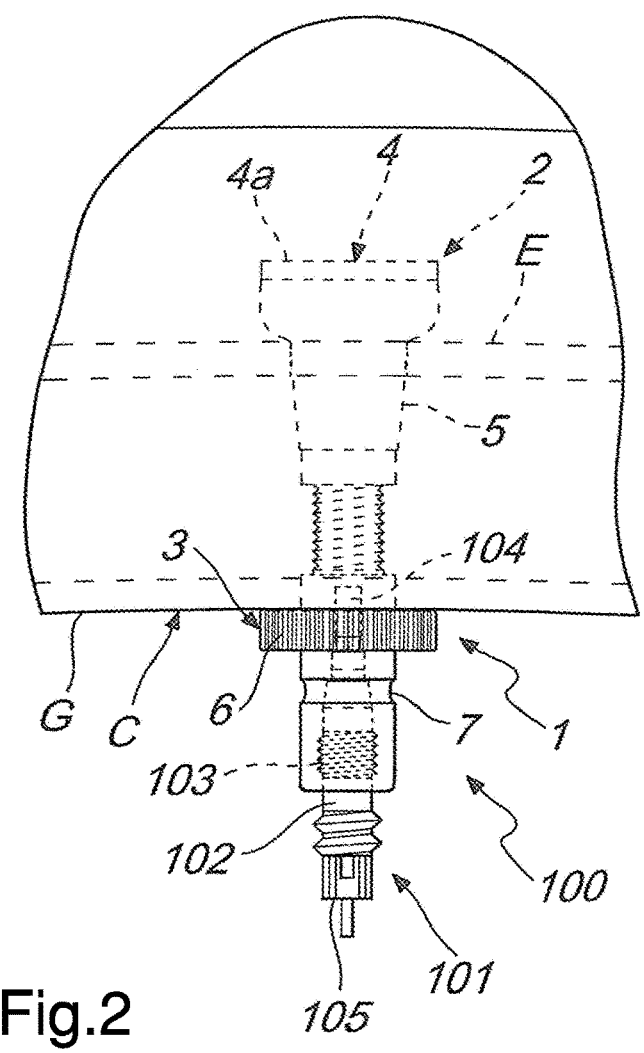
FIG. 2 shows the coupling and the assembly fitted on a tire, in a front elevation view.
Figure 3:
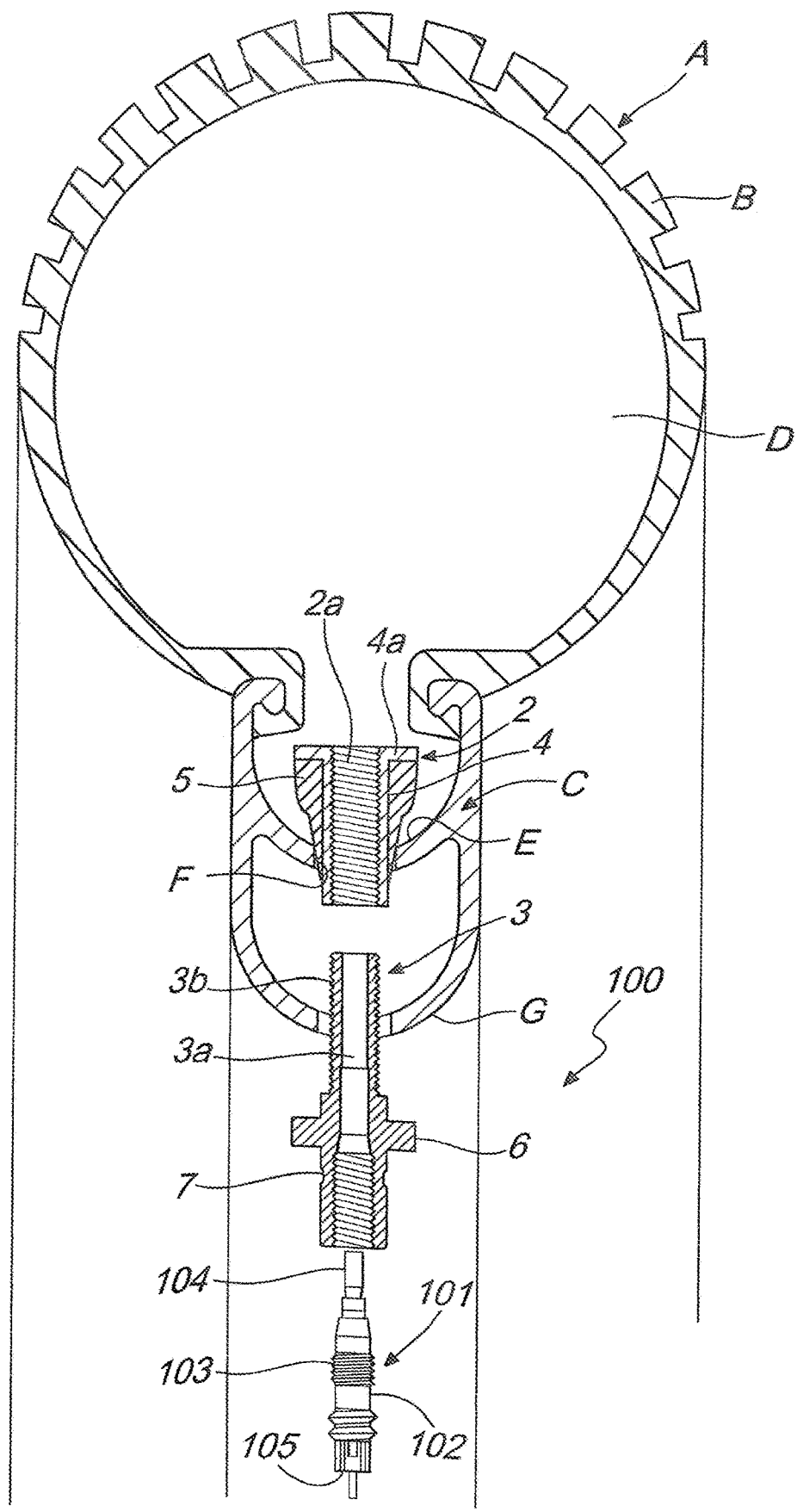
FIGS. 3 and 4 show the coupling and assembly sectioned according to a longitudinal plane and show the fitting thereof on the latter.
Figure 4:
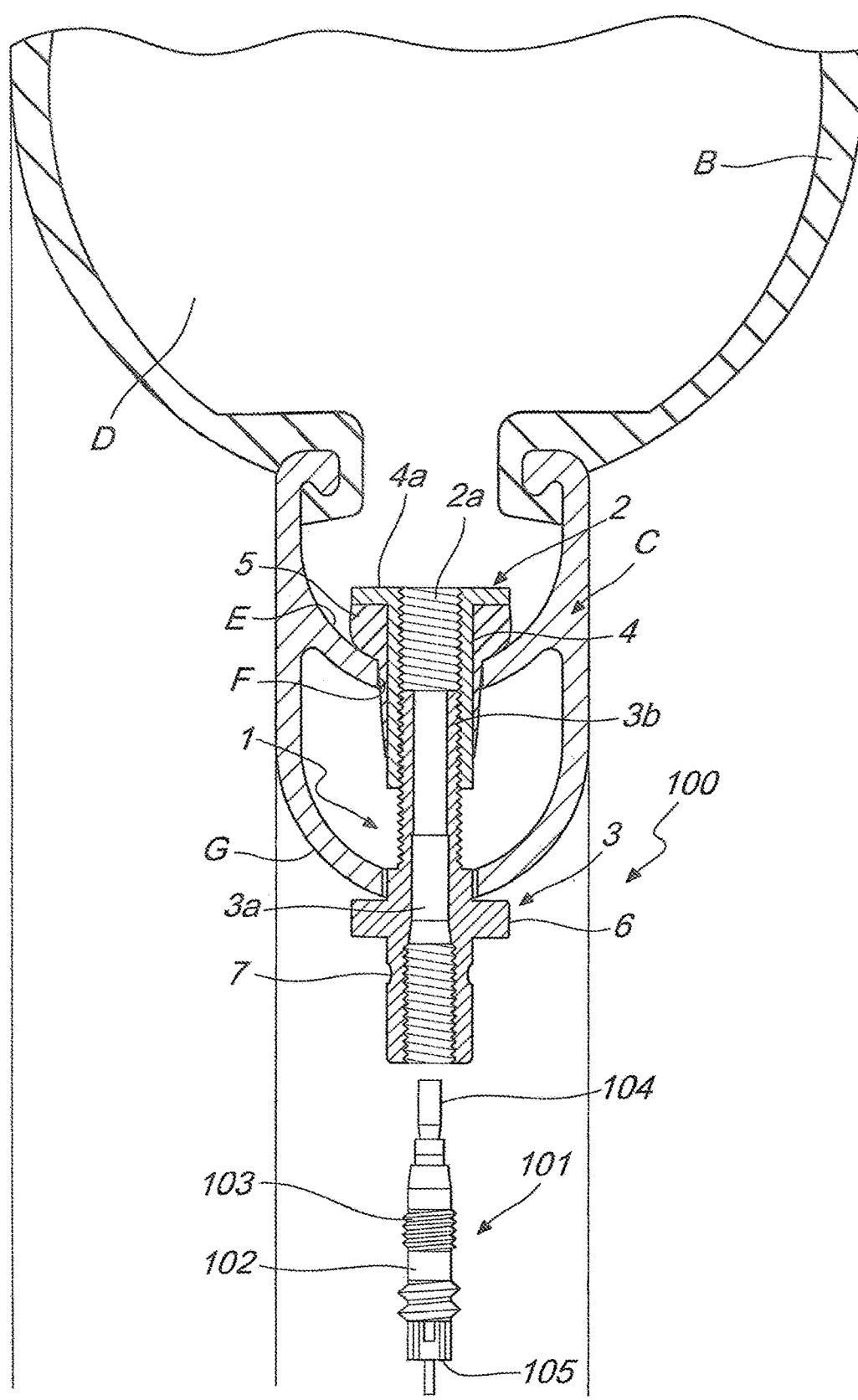

With particular reference to the aforementioned figures, reference number 1 globally designates a coupling for valve assemblies 100, which can find typical application on tubeless tires A, comprising an enclosure B arranged so as to cover a rigid rim C of a vehicle (of any type). This way, in fact, and in a known manner, the tire A and the rim C delimit a substantially tubular compartment D (precisely surrounding the rim C), which is filled with a gas under pressure (typically air) so as to allow optimal support and grip to the ground, for the rim C itself and the vehicle.

It should be explained that in the typical application the tire A is preferably intended to cover rims C of bicycles, but it can also cover rims C of other vehicles. In any case, the tire A is of the "tubeless" type, i.e. the compartment D is without inner tubes and is intended to be entirely filled with air under pressure (through the coupling 1 and the assembly 100, as will be seen).

According to the invention, the coupling 1 comprises a first element 2 and a second element 3 which are crossed by a first through channel 2a, which is (completely or partially) internally threaded, and by a second through channel 3a, respectively.

As will be illustrated in more detail below, the second element 3 is adapted to cooperate with a valve 101 (also of known type), which is comprised in the assembly 100 and that is able to selectively close the second channel 3a, so as to prevent the passage of air until the tire A is inflated or deflated.

It should be specified since now that the protection claimed herein first of all encompasses couplings 1 wherein, as in the accompanying figures, the valve 101 is a separate component, distinct from the second element 3. In this case, therefore, the valve 101 is not part of coupling 1 according to the invention but is comprised in the assembly 100, to which in any case the invention is related. Likewise, the scope of protection outlined herein must certainly be understood as extended to couplings 1 according to the invention which comprise the valve 101, since it is integrated in the second element 3 and can be of the type which will be described in the following pages, or even different, anyway able to prevent and selectively permit the passage of air.

The first element 2 comprises first means for stable resting on an internal surface E of the rim C (such internal surface E is then directly facing the compartment D). As further explained hereinafter, these first means can be activated automatically when, from the inside of the compartment D, the first element 2 is inserted, hermetically, in a hole F made along the rim C.

The second element 3 in turn comprises second means for stable resting on an external surface G of the rim C (such external surface G is then directly facing the external environment), which can be activated (automatically) when, from the outside of the compartment D, a threaded stem 3b of the second element 3 itself is screwed in the first channel 2a.

It should also be noticed that with the screwing of the stem 3b is first of all possible to mate the two aforementioned elements 2, 3 and, at the same time, to align the channels 2a, 3a, in order to connect the compartment D to the outside, through precisely the latter.

Air can therefore run through the aligned channels 2a, 3a to enter or exit the compartment D.

In addition, the coupling 1, which performs a similar function of a single body piece in known valve assemblies, is stably mated to the rim C, since from the inside and the outside, the first element 2 and the second element 3, respectively, abut and rest against corresponding surfaces E, G, thus preventing any relative movement by interference.

It should also be specified that the first means and the second means are typically intended to rest against surfaces E, G of the rim C, but their reference to the surfaces of a different component cannot be ruled out, without thereby departing from the scope of protection claimed herein.

It is noticed that, to obtain the desired tightness between the stem 3b and the first channel 2a, the former has to perform a short screwing stroke, so as to engage some spirals of its threads with respective spirals of the threads of the first channel 2a.

Nevertheless, in an improved embodiment, precisely to ensure an optimum tightness of the mating obtained with the screwing of the stem 3b in the first channel 2a, at least one of them (and preferably the stem 3b) is spread beforehand with a sealing substance, of the Teflon type (which is a registered trademark) and the like.

Following the screwing, in fact, the sealing substance (whether it is Teflon, which is a registered trademark, or other) completely fills also the minimum cavities that may possibly be formed between the threads of the stem 3b and of the first channel 2a, hindering also the minimum passage of air and therefore precisely ensuring an optimum tightness.

In an embodiment of significant practical interest, given in the accompanying figures as an illustrative and non-limiting application of the invention, the first element 2 comprises a substantially cylindrical bush 4, which is crossed longitudinally by the first channel 2a and which can be inserted hermetically in the hole F.

In this embodiment, the first means are constituted substantially by a tangential expansion 4a of the bush 4, suitably chosen of dimensions greater than those of the hole F (usually standard).

Thus, when the bush 4 is inserted hermetically in the hole F, the expansion 4a is intended to stably rest on the internal surface E of the rim C (surrounding the hole F), preventing further moving forward by mechanical interference.

In a first possible embodiment, it is the bush 4 that is directly brought to press against the edge of the hole F, to achieve the desired tightness.

In the preferred solution, on the other hand, illustrated in the attached figures, the bush 4 (or in any case the first element 2) is covered externally with a first gasket 5 (usually made of rubber or other elastomeric material).

This way, it is precisely the first gasket 5 that is pressed against the edge of the hole F: thanks to the elastic properties of the material with which it is made, it can adapt to the shape and any imperfection of the hole F to the best, precisely ensuring an optimal tightness of the mating obtained as a consequence of the insertion of the first element 2 in the hole F.

With further reference to the solution illustrated in the accompanying figures, the second element 3 is constituted by a substantially axially symmetrical tube (suitably shaped, as will be seen), which is precisely crossed by the second channel 3a that forms, with its end portion, the stem 3b.

In this preferred but not exclusive embodiment, the second means of stable resting are constituted by an intermediate portion of the tube, which is contiguous to the stem 3b, and forms externally a sort of knurled ring 6.

The ring 6 thus performs a dual function: thanks to knurling, it can first be easily tightened by a respective tool (pliers or the like, such as will be shown below), to obtain the facilitated movement of the stem 3b, and of the tube (in particular to screw or unscrew it). Moreover, it is precisely the ring 6 that is intended to rest stably on the external surface G of the rim C, as a consequence of the hermetic screwing of the stem 3b in the first channel 2a.

Similarly to the expansion 4a, the ring 6 causes the stop of the screwing of the stem 3b in the first channel 2a and prevents further strokes.

As a matter of fact, therefore, in the preferred (not exclusive) solution the rim C remains tightened between the expansion 4a and the ring 6, resulting in the stable mating between the coupling 1 and the rim C (whatever the size and the shape of the latter).

It is specified that it is envisaged the possibility to place a second gasket externally to the tube, between the ring 6 and the stem 3b, so as to obtain an optimal resting on the external surface G of the rim C.

Advantageously, the tube also has an external groove 7, substantially on the opposite side with respect to the stem 3b, for mating to a protective cap, which can be arranged so as to cover the second element 3.

Note how simply varying the groove 7 (and therefore with minimal changes to the second element 3 and maintaining the same first element 2) it is possible to adapt the coupling 1 to different types of cap or otherwise prepare it for mating with different structures, ensuring high versatility to the invention.

A special example of a protective cap to be fitted on the tube is shown in FIGS. 5 to 7 and will be described in more detail below.

This invention (and the protection claimed herein) also relates to a valve assembly 100, intended for tubeless tires A which, as already observed, comprise an enclosure B normally arranged so as to cover a rigid rim C of a vehicle, to delimit a substantially tubular compartment D, which can in turn be filled with pressurized gas (typically air).

As far as the extension of the scope of application and protection are concerned, the same considerations apply as indicated in the previous pages in relation to coupling 1.

According to the invention, in addition to a coupling 1 having one or more of the various features indicated in the previous pages, the assembly 100 comprises a valve 101 for the selective closure of the second channel 3a. More precisely, this valve 101 is normally arranged so as to hinder the free passage of gas through the channels 2a, 3a (to maintain the desired pressure value in the compartment D) and can be deactivated selectively (and temporarily) to allow the introduction of gas in the compartment D (typically by means of a pump) and/or the exit of gas from the compartment D (simply by leaving the passage open and exploiting the difference in pressure with the external environment).

It is specified that the assembly 100 according to the invention can above all comprise three distinct components, constituted precisely by the first element 2, the second element 3 and the valve 101.

Likewise, the assembly 100 can also simply have a first element 2 and a second component, in which are integrated the second element 3 and the valve 101 (of the type that will be illustrated below, or even different).

In one form of embodiment of significant practical interest, mentioned for illustrative and non-limiting purposes for the application of the invention, the valve 101 comprises a sleeve 102 axially crossed by a through duct.

Thanks to an external thread 103, the sleeve 102 can be partially screwed into the second element 3 (in the second channel 3a), on the opposite side with respect to the stem 3b.

Inside the sleeve 102 a piston 104 therefore slides which, when the sleeve 102 is screwed into the second element 3, can be arranged so as to close the second channel 3a, in at least one active configuration. In the solution of the attached figures, this is made possible by the shape given to the ending part of the piston 104, which replicates that of at least a portion of the second channel 3a: in the active configuration, the piston 104 is arranged in a such a manner that its ending part is in this portion, precisely hindering completely the second channel 3a.

The piston 104 is then movable selectively from the active configuration, to allow the introduction of gas into the compartment D and/or the exit of gas from the compartment D itself.

As is also apparent from the attached figures, the movement of the piston 104, which allows to remove it at least partially from the second channel 3a, preferably takes place by acting on a shank 105 of the piston 104 itself, which protrudes from the opposite side with respect to the sleeve 102 and which is therefore maintained easily accessible during use.

The valve 101 shown in the figures is of the type commonly known as "Presta" valve; alternative embodiments cannot however be ruled out in which the valve 101 is instead of the "Schrader" type or even a different type.

Conveniently, the assembly 100 also comprises at least one protective cap 110 having a first internal seat 111 and arrangeable to at least partly cover the second element 3 and the valve 101.

The protective cap 110 comprises first tightening means 112 defining the aforementioned tool for the facilitated movement of the stem 3b in screwing and/or unscrewing in the first channel 2a.

The first tightening means 112 comprise at least one serrated surface 113 that is formed on a portion of the first internal seat 111 and which is intended to grip on the knurled ring 6.

In this regard it is noticed that, in the present context, "serrated surface" means a generic surface having protrusions and recesses, which can consist of a series of teeth and/or of a sort of knurling and which, placed in contact with the knurled ring 6, allow the stable gripping of the latter.

The protective cap 110 is deformable between an inactive configuration, wherein the serrated surface 113 is moved away from the knurled ring 6 and the protective cap 110 is free to rotate around the tube of the second element 3, and a work configuration, wherein the serrated surface 113 is approached to and grips the knurled ring 6 and the setting in rotation of the protective cap 110 sets in rotation the knurled ring 6 around its own axis.

Preferably, the protective cap 110 is made of plastic so as to be manually pressed by the user to pass from the inactive configuration to the work configuration and elastically return to the inactive configuration when the user stops pressing it.

More in detail, the serrated surfaces 113 are two and are arranged on diametrically opposite sides to the first internal seat 111. The pressing of the walls of the protective cap 110 allows approaching the serrated surfaces 113 to the knurled ring 6 on opposite sides to the same, ensuring the stable gripping of the knurled ring 6 by the user who, in practice, can use the protective cap 110 as a maneuvering element to screw and unscrew the second element 3 with respect to the first element 2.

As said, in the inactive configuration the protective cap 110 is freely rotatable around the second element 3. For this purpose the protective cap 110 comprises an internal raised part 114 facing the first internal seat 111 and which engages the external groove 7 of the second element 3. The external groove 7 has an annular and circular shape and, therefore, the mating between the external groove 7 and the internal raised part 114 is such as to allow the protective cap 110 to rotate around the second element 3 without the possibility of sliding longitudinally to the coupling 1. To remove the protective cap 110 from the second element 3, the user must manually apply a force on the protective cap 110 directed to force the exit of the internal raised part 114 from the external groove 7 and to remove the protective cap 110 from the coupling 1.

Conveniently, the protective cap 110 comprises an external profile 115 of wing and aerodynamic shape and, when the protective cap 110 is in the inactive configuration, the setting in rotation of the rim C during the normal advancement of the vehicle to the ground determines the automatic flag-like positioning of the protective cap 110.

The flag-like positioning of the protective cap 110 means that the cap 110 is arranged "edgewise" with respect to the flow of air that strikes it during motion. In this position, the external profile 115 of the protective cap 110 provides the least possible friction. The flag-like positioning of the protective cap 110 is automatic, considering that, as said, in the inactive configuration the protective cap 110 is free to rotate around the second element 3 and, therefore, the flow of air that strikes it during motion constitutes the only force able to make it rotate.

The protective cap 110 also comprises second tightening means 116 for the facilitated screwing of the sleeve 102 in the second element 3.

The second tightening means 116 comprise at least a second internal seat 117 formed in the protective cap 110 and having at least a prismatic section 117a mateable in a prismatic manner to a corresponding prismatic surface 102a of the sleeve 102.

In practice, when the user removes the protective cap 110 from the second element 3 by disengaging the internal raised part 114 from the external groove 7, then the user can put on again the protective cap 110 on the valve 101, this time no longer at the first internal seat 111 but rather at the second internal seat 117.

The setting in rotation of the protective cap 110 mated to the prismatic surface 102a sets in rotation the sleeve 102 around its own axis and the protective cap 110 is used as a maneuvering element to screw and unscrew the valve 101 with respect to the second element 3.

Besides the coupling 1 and the assembly 100, the present invention (and the protection claimed herein) also relates to a method for fitting a valve assembly 100 on tubeless tires A, comprising an enclosure B normally arranged so as to cover a rigid rim C of a vehicle, in order to delimit a substantially tubular compartment D, fillable with gas (air) under pressure (according to what has been already noticed in the previous pages).

The method consists, at a step a., of preparing a first element 2 and a second element 3 which are crossed by a first internally threaded through channel 2a and by a second through channel 3a, respectively.

Subsequently, the method consists, at a step b., of inserting hermetically, from the inside of the compartment D, the first element 2 in a hole F made along the rim C, until the first element 2 rests stably on an internal surface E of the rim C.

Then, at a step c. the method provides to screw hermetically, from the outside of the compartment D, a threaded stem 3b of the second element 3 into the first channel 2a, until the second element 3 rests stably on an external surface G of the rim C and with consequent alignment between the channels 2a, 3a, in order to connect the compartment D to the outside.

Subsequently, at a step d. the method provides to associate with the second element 3, on the opposite side with respect to the first element 2, a valve 101 for the selective closure of the second channel 3a, which is normally arranged so as to hinder the free passage of gas through the channels 2a, 3a, and selectively deactivatable to allow the introduction of gas in the compartment D and/or the exit of gas from the compartment D.

It should also be noticed that the step d. can be accomplished in advance, since the present invention also relates to the realization of couplings 1 and assemblies 100 wherein the valve 101 is integrated in the second element 3.

At the end of step d., therefore, through the valve assembly 100 it is first of all possible to prevent the unwanted exit of air from the compartment D, and, where appropriate, taking care to deactivate it temporarily, it is possible to inflate the tire A, attaching a pump to the valve 101 and/or to the second element 3.

The operation of the coupling and of the valve assembly according to the invention is thus already been substantially anticipated in the previous pages, and in any case is the following.

To mate the assembly 100 to a rim C covered with a tire A (with a delimiting compartment D between them), it is envisaged first of all to insert from the inside of the compartment D, in the hole F, the first element 2, carrying the expansion 4a resting on the internal surface E of the rim C.

In this condition, the passage of air between the hole F and the first element 2 is preferably prevented by the first gasket 5.

Subsequently, from the outside of the compartment D the stem 3b is screwed in the first channel 2a of the first element 2, and the screwing stroke continues until the ring 6 rests on the external surface G of the rim C.

When such layout is obtained, the expansion 4a and the ring 6 are evidently pressed against the internal surface E and the external surface G, respectively and therefore prevent any movement of the coupling 1 (comprising the elements 2, 3 now mutually constrained in a stable manner, thanks to the screwing of the stem 3b) with respect to the rim C. In this condition, the air can enter the compartment D or exit only through the channels 2a, 3a (thanks to the tightness that is achieved between the threads of the stem 3b and those of the first channel 2a), mutually aligned.

The passage of air is regulated by the valve 101, which is mated to the coupling 1 at the free end of the second element 3, protruding externally, where, however, also a pump has to be attached (according to modalities known in themselves), when the tire has to be inflated.

In this circumstance, the user must move the piston 104 from the active configuration thus allowing air to enter in the duct defined internally to the sleeve 102; from it, the air no longer hindered by the piston 104 can be conveyed to the channels 2a, 3a, and therefore in the compartment D.

While the single body piece present in the known valve assemblies (replaced in the assembly 100 by the coupling 1) protrudes outward with a different portion from time to time, depending on the shape of the rim C and of its size, this doesn't occur using the coupling 1 according to the invention.

In fact, even when the distance varies between the internal surface E of the rim C (against which the first element 2 rests) and the external surface G of the rim C (against which the second element 3 rests), the screwing stroke varies accordingly of the stem 3b in the first channel 2a, which continues precisely until the second element 3 rests, with the ring 6, on the external surface G of the rim C.

After reaching this condition, the externally protruding portion of the coupling 1 (of the second element 3) is clearly predefined a priori and constant, since substantially equal to the distance between the ring 6 and the free end of the tube.

It is therefore possible to size the tube in such a way that the protruding portion of the coupling 1 has the desired length, sufficient to enable a practical mating to the pump (or other devices), but not so long to determine a significant lever arm and therefore dangerous bending moments or torques, when in fact the user mates the pump to the valve 101 and/or to the second element 3.

The use of two elements 2, 3 therefore allows to achieve the intended object, since it is possible to control the length of the protruding portion of the coupling 1 (of the second element 3) and of the assembly 100, maintaining it sufficiently reduced so as to avoid dangerous stress and thus avoiding (or at least limiting) the risk of breakage or deformation.

The mating between coupling 1 (and/or assembly 100) and pump has greater strength and greater resistance to transverse thrust, compared to known solutions.

It should also be noticed that the coupling 1 and the assembly 100 prove to be extremely versatile, since, as already observed, it is sufficient to make small changes to the second element 3 to allow its mating to caps and other structures of any shape and size, without having to completely change the components.

The pumps can also be any, dedicated or commercial, simply by varying the shape of the coupling 1 and in particular of the second element 3 and/or of the valve 101.

The invention claimed is:

1. A coupling for a valve assembly, for a tubeless tire, comprising an enclosure arranged so as to cover a rigid rim of a wheel, in order to delimit a tubular compartment, which can be filled with gas under pressure, wherein said coupling comprises a first element and a second element which are crossed respectively by a first through channel, which is threaded internally, and by a second through channel, said second dement being adapted to cooperate with a valve that is included in the valve assembly, for a selective closure of said second channel, said first element comprising first means for stably resting on an internal surface of the rigid rim, which can be activated following hermetic insertion of the first element, from an inside of the tubular compartment, in a hole provided in the rigid rim, said second element comprising second means for stably resting on an external surface of the rigid rim which can be activated following insertion of the second element, from an outside of the tubular compartment, of a threaded stem of said second element in said first channel, with consequent alignment between said first and second channels.

2. The coupling according to claim 1, wherein at least one of said threaded stem and said first channel comprises a sealing substance.

3. The coupling according to claim 1, wherein said first element comprises a cylindrical bush, which is crossed longitudinally by said first channel and can be inserted hermetically in the hole, said first means comprising a tangential expansion of said cylindrical bush, which is configured to be disposed on the internal surface of the rigid rim following insertion of said cylindrical bush in the hole.

4. The coupling according to claim 1, wherein said first element comprises a first gasket on an external surface of said first element.

5. The coupling according to claim 1, wherein said second element comprises an axially symmetrical tube, which is crossed by said second channel and forms, with an end portion thereof, said threaded stem.

6. The coupling according to claim 5, wherein said second means comprise intermediate portion of said axially symmetrical tube, which is contiguous to said threaded stem and forms externally a texturized ring, which can be tightened by a respective tool for movement of said threaded stem and is to stably rest on the external surface of the rigid rim as a consequence of a hermetic screwing of said threaded stein in said first channel.

7. The coupling according to claim 5, wherein said axially symmetrical tube is provided with an external groove, on an opposite side of said second element with respect to said threaded stem, for coupling to a protective cap, which is configured to cover a portion of said second element.

8. A valve assembly for tubeless tires comprising an enclosure arranged so as to cover a rigid rim of a wheel, in order to delimit a tubular compartment, which can be filled with pressurized gas, wherein said valve assembly comprises a coupling according to claim 1 and said valve for the selective closure of said second channel, with said valve being configured to selectively hinder a free passage of gas through said first and second channels and being configured to be selectively deactivated to allow for at least one of an introduction of gas into the tubular compartment and an exit of gas from the tubular compartment.

9. The assembly according to claim 8, wherein said valve comprises a sleeve that is crossed axially by a through duct and can be screwed partially into said second element, on an opposite side of said second element with respect to said threaded stem, a piston being able to slide within said sleeve and being arrangeable in at least one active configuration so as to close said second channel, when said sleeve is screwed into said second element, said piston being movable selectively from said at least one active configuration to allow for the at least one of the introduction of gas into the tubular compartment and the exit of gas from the tubular compartment.

10. The assembly according to claim 8, wherein said valve assembly comprises at least one protective cap having a first internal seat is configured to at least partly cover said second element and said valve, said protective cap comprising a first tightening means defining a tool that is configured selectively couple with said second element to facilitate at least one of a screwing and an unscrewing said threaded stem in said first channel.

11. The assembly, according to claim 10, wherein: said second element comprises an axially symmetrical tube, which is crossed by said second channel and forms, with an end portion thereof, said threaded stem; said second means comprising an intermediate portion of said axially symmetrical tube, which is contiguous to said threaded stem and forms externally a texturized ring, which can be tightened by said tool and is configured to stably rest on the external surface of the rim as a consequence of insertion of said threaded stem in said first channel; and said first tightening means comprise at least one serrated surface that is formed on a portion of said first internal seat, said protective cap being deformable between an inactive configuration, wherein said serrated surface is moved away from said texturized ring such that said protective cap is free to rotate around said axially symmetrical tube, and a work configuration, wherein said serrated surface is approached to and grips said texturized ring and wherein rotation of said protective cap sets in rotation said texturized ring around an axis of said texturized ring.

12. The assembly, according to claim 11, wherein said protective cap comprises an aerodynamic shape and, and wherein when said protective cap is in said inactive configuration, a rotation of said rigid rim during an advancement of said wheel allows said protective cap to move to an aerodynamic position.

13. The assembly, according to claim 10, wherein said protective cap comprises a second tightening means for to facilitate a screwing of said sleeve in said second element.

14. The assembly, according to claim 13, wherein said second tightening means comprise at least a second internal seat having at least a prismatic section mateable in a prismatic manner to a corresponding prismatic surface of said sleeve, such that setting in rotation of said protective cap mated to said prismatic surface sets said sleeve in rotation around an axis of said sleeve.

15. A method for coupling a valve assembly on a tubeless tire assembly, which comprises an enclosure arranged so as to cover a rigid rim of a wheel, in order to delimit a tubular compartment, which can be filled with gas under pressure, said method comprising: a. providing a coupling which comprises a first element and a second element which are crossed respectively by a first internally, threaded through channel and by a second through channel; b. from an inside of the tubular compartment, inserting hermetically the first element in a hole provided along the rigid rim, until the first element is stably rest on an internal surface of the rigid rim; c. from an outside of the tubular compartment, screwing hermetically a threaded stem of the second element into the first channel, until the second element is stably rest on an external surface of the rigid rim and with consequent alignment between the first and second channels to connect the tubular compartment to ambient air outside of the tubular compartment; and d. associating with the second element a valve for a selective closure of the second channel, with such valve being configured to selectively hinder a free passage of gas through the first and second channels and being configured to be selectively deactivated to allow for at least one of an introduction of gas into the tubular compartment and an exit of gas from the tubular compartment.

16. The coupling according to claim 2, wherein said sealing substance comprises polytetrafluoroethylene.

\* \* \* \* \*